(12) United States Patent
Matsunaga et al.

(10) Patent No.: US 8,081,281 B2
(45) Date of Patent: Dec. 20, 2011

(54) LIQUID CRYSTAL DISPLAY DEVICE

(75) Inventors: Naohiro Matsunaga, Shizuoka (JP); Jun Watanabe, Kanagawa (JP); Takuji Okura, Kanagawa (JP); Yutaro Mitsumori, Kanagawa (JP); Yasushi Tanabe, Kanagawa (JP); Ryuji Saneto, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 329 days.

(21) Appl. No.: 12/236,339

(22) Filed: Sep. 23, 2008

(65) Prior Publication Data

US 2009/0080082 A1  Mar. 26, 2009

(30) Foreign Application Priority Data

Sep. 26, 2007  (JP) ................. 2007-250100

(51) Int. Cl.
*G02F 1/1333* (2006.01)
*G02F 1/1335* (2006.01)
*G02B 27/00* (2006.01)
*G02B 1/11* (2006.01)

(52) U.S. Cl. .................... 349/137; 349/122; 359/609
(58) Field of Classification Search .............. 349/137, 349/122; 359/609
See application file for complete search history.

(56) References Cited

U.S. PATENT DOCUMENTS

| 5,884,991 A * | 3/1999 | Levis et al. ............ 353/122 |
| 2007/0121211 A1* | 5/2007 | Watanabe et al. ........ 359/601 |
| 2007/0217015 A1 | 9/2007 | Furuya et al. |

FOREIGN PATENT DOCUMENTS

| JP | 2005-195819 A | 7/2005 |
| JP | 2007-41533 A | 2/2007 |
| JP | 2007-187952 A | 7/2007 |
| WO | WO-2006/088203 A1 | 8/2006 |

\* cited by examiner

*Primary Examiner* — Brian M. Healy
*Assistant Examiner* — Jerry Blevins
(74) *Attorney, Agent, or Firm* — Birch, Stewart, Kolasch & Birch, LLP

(57) ABSTRACT

A liquid crystal display device includes: a protective film; a polarizing plate; a liquid crystal cell for display; and a backlight, in this order, wherein the protective film is an antiglare optical film including a transparent substrate and at least one antiglare layer and having a concavo-convex shape on a surface of the antiglare optical film, and an integrated frequency value of tilted plane components having tilt angles between a normal line of the transparent substrate and a normal line of the concavo-convex shape on a surface of the antiglare optical film ranging from 0.05 to 0.25° is from 10 to 25% while an integrated frequency value of tilted plane components having the tilt angles ranging from 1.5 to 2.5° is from 10 to 25%.

10 Claims, 2 Drawing Sheets

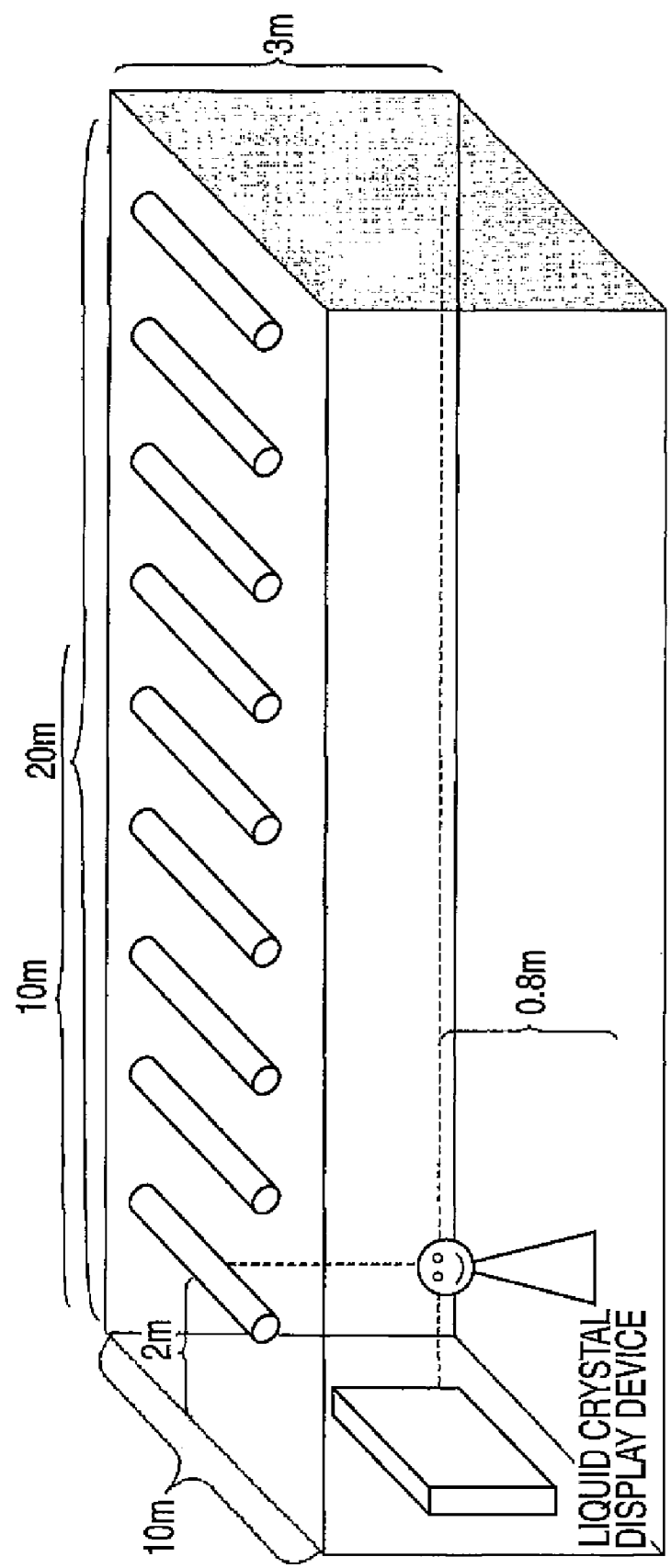

LIQUID CRYSTAL DISPLAY DEVICE

CROSS-REFERENCE TO RELATED APPLICATIONS

This application claims the benefit of Japanese Patent Application JP 2007-250100, filed Sep. 26, 2007, the entire content of which is hereby incorporated by reference, the same as if set forth at length.

FIELD OF THE INVENTION

This invention relates to a liquid crystal display device.

BACKGROUND OF THE INVENTION

An antiglare optical film is generally disposed on the outermost surface of a display in a display device such as a plasma display (PDP), an electroluminescence display (ELD) or a liquid crystal display device (LCD) for preventing the formation of reflected images caused by reflection of external light.

With the recent rapid increase in the size of display screens as typically observed in liquid crystal TVs and so on, antiglare optical films are utilized not only in household devices but also in devices to be placed in larger rooms such as station or airport waiting rooms. Under these circumstances, it becomes necessary to prevent the formation of reflected images caused by reflection of external light under various indoor environments over a wide range.

To prevent the formation of reflected images caused by reflection of external light, it has been a common practice to employ an antiglare optical film having a concavo-convex shape on the surface (a tilted plane) whereby the outline of a reflected image is blurred. Thus, the visibility in the specular reflection direction of external light is improved. On the other hand, however, scattering lights enter directions other than the specular reflection direction and thus a black image takes on whitish looks (i.e., the phenomenon called "white blur"). Therefore, attempts have been made to exclusively elevate the effective antiglare components (tilted plane components) to thereby prevent both of the formation of reflected images and white blur (see, for example, WO 2006/088203, JP-A-2007-41533, JP-A-2005-195819 and JP-A-2007-187952), wherein the tilt angles of the peaks and valleys (concavity and convexity) on the surface are defined.

In the case where a display is placed in a larger room such as a station or airport waiting room, however, there are multiple lighting fixtures at short and long distances from the display. By using the existing techniques as discussed above, it is difficult to stably prevent both of the formation of reflected images and white blur caused by these lighting fixtures at short and long distances from the display. In the case of placing a large-sized display of 32 inches or more in a large room, the above-described phenomena become particularly serious and, therefore, it has been required to develop techniques for overcoming these problems.

SUMMARY OF THE INVENTION

As described above, there has been proposed hitherto no liquid crystal display device by which both of the formation of reflected images and white blur can be stably prevented not only in the common household environment where a lighting fixture is located exclusively close to the display but also in larger room environment (for example, station or airport waiting rooms) where multiple lighting fixtures are located at short and long distances from the display. An aspect of the invention is to solve the above-described problems by providing a liquid crystal display device by which both of the formation of reflected images and white blur can be stably prevented under various indoor environments over a wide range.

The inventors have conducted intensive studies to solve the above-described problems. As a result, they have found out that the problems can be solved and the aspect can be achieved by employing the following constitution, thereby completing the invention.

1. A liquid crystal display device at least comprising a polarizing plate, a liquid crystal cell for display and a backlight in this order, wherein the polarizing plate has a protective film placed at least at the viewer-side outermost surface, the protective film is an antiglare optical film which comprises a transparent substrate and at least one antiglare layer provided on the transparent substrate and has a concavo-convex shape on the surface, and the integrated frequency value of the tilted plane components having tilt angles between the normal line of the transparent substrate and the normal line of the concavo-convex shape on the surface of the antiglare optical film ranging from 0.05 to 0.25° is 10% or more but not more than 25% while the integrated frequency value of the tilted plane components having tilt angles ranging from 1.5 to 2.5° is 10% or more but not more than 25%.

2. The liquid crystal display device as described in above 1, wherein the antiglare layer has at least a resin matrix and light transmitting particles contained in the resin matrix and the thickness (d) of the antiglare layer and the average particle diameter (D) of the light transmitting particles satisfy all of the following formulae (1), (2) and (3):

$$7 \leq d \leq 30 \ (\mu m) \quad \text{Formula (1)}$$

$$0.25 \leq (D/d) \leq 0.75 \quad \text{Formula (2)}$$

$$2.0 \leq (d-D) \leq 15 \ (\mu m). \quad \text{Formula (3)}$$

3. The liquid crystal display device as described in above 2, wherein the refractive index of the light transmitting particles contained in the antiglare layer is 1.55 to 1.58.

4. The liquid crystal display device as described in above 2 or 3, which comprises, as the light transmitting particles contained in the antiglare layer, at least either of two or more kinds of particles having different average particle diameters from each other and two or more kinds of particles having different refractive indexes from each other.

5. The liquid crystal display device as described in any one of above 1 to 4, wherein the antiglare optical film has a layer as the outermost layer having a refractive index that is lower than the refractive index of the adjacent layer and the integrating sphere-measured reflectivity (the average of the values measured at 450 nm to 650 nm) of the antiglare optical film is less than 3.0%.

6. The liquid crystal display device as described in any one of above 1 to 5, wherein the diagonal length of the display screen is 32 inches or more.

According to the invention, it is possible to provide a liquid crystal display device by which both of the formation of reflected images and white blur can be stably prevented under various indoor environments over a wide range.

BRIEF DESCRIPTION OF THE DRAWINGS

FIG. 2 is a schematic view showing the system of measuring the effect of preventing the formation of reflected images.

DETAILED DESCRIPTION OF THE INVENTION

Figure 1A:
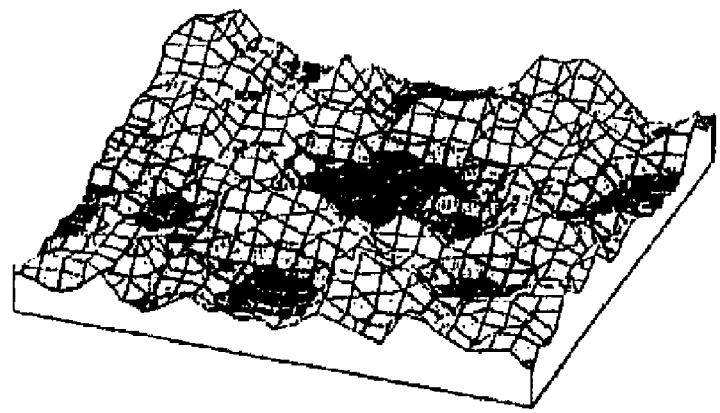
FIGS. 1A to 1C are schematic views each roughly showing a tilt angle measurement method.

Now, the invention will be illustrated in greater detail. In the present specification, when a numerical value represents the value of a physical property, the value of a characteristic or the like, "(numerical value 1) to (numerical value 2)" means "(numerical value 1) or more but (numerical value 2) or less." In the present specification, "(meth)acrylate" means "at least one of acrylate and methacrylate" and the same applies to "(meth) acrylic acid" and so on.

The liquid crystal display device according to the invention is a liquid crystal display device at least comprising a polarizing plate, a liquid crystal cell for display and a backlight in this order, wherein the polarizing plate has a protective film placed at least at the viewer-side outermost surface (i.e., the side opposite to the liquid crystal cell for display), the protective film is an antiglare optical film which comprises a transparent substrate and at least one antiglare layer provided on the transparent substrate and has a concavo-convex shape (peak-and-valley shape) on the surface, and the integrated frequency value of the tilted plane components having tilt angles between the normal line of the transparent substrate and the normal line of the concavo-convex shape on the surface of the antiglare optical film ranging from 0.05 to 0.25° is 10% or more but not more than 25% while the integrated frequency value of the tilted plane components having tilt angles ranging from 1.5 to 2.5° is 10% or more but not more than 25%.

Next, the individual constituting elements of the liquid crystal display device according to the invention will be illustrated.

[Tilt Angle Distribution of Concavo-Convex Shape on Antiglare Optical Film Surface]

Next, the antiglare optical film involved in the liquid crystal display device according to the invention will be illustrated.

The antiglare optical film (hereinafter sometimes called "optical film") has at least a concavo-convex shape (tilted plane) on the surface and scatters a reflected image and thus blurs the outline thereof via light scattering to thereby exert its antiglare properties. In the invention, the tilt angles and the proportion thereof are determined by the following methods.

First, vertexes of a triangle having an area of 0.5 to 2 square micrometers are supposed on a transparent substrate, and normal lines are drawn vertically upward from the vertexes (three normal lines on the substrate). A triangle is formed by connecting the three points at which these three normal lines on the substrate intersect with the film surface. Then, an angle between a normal of the triangle thus formed and a normal line drawn vertically upward from the substrate surface is defined as tilt angle.

Next, it will be illustrated how to determine the proportion of tilt angles. An area of at least 250,000 square micrometers (0.25 square millimeters) on the substrate is divided into the above-described triangles and the tilt angle is measured on every triangle. The tilt angle is determined at each measuring point and then the proportion (frequency) of measuring points of each tilt angle to all the measuring points is determined. This proportion is defined as the proportion of the tilt angle. In the invention, the integrated frequency value of the tilt angles ranging from 0.05 to 0.25° and the integrated frequency value of the tilt angles ranging from 1.5 to 2.5° are determined.

Next, the method of measuring the tilt angle will be described in greater detail. As shown in FIG. 1A, the substrate surface of the measurement sample is partitioned into meshes having areas of 0.5 to 2 square micrometers.

Figure 1B:
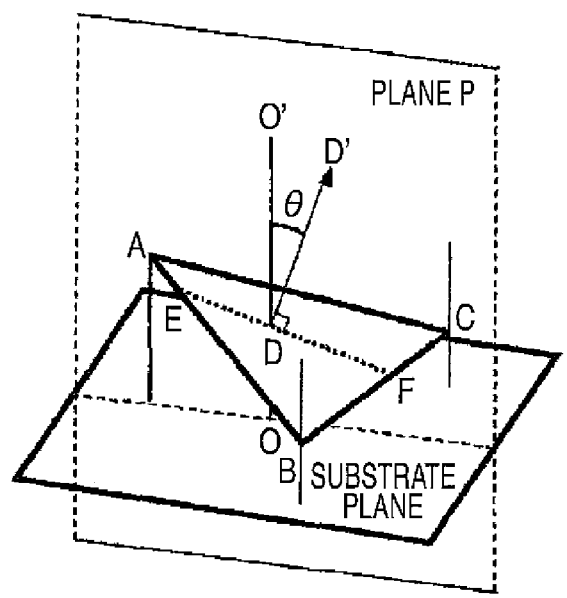

FIG. 1B is a diagram showing three points of one triangle constituting a partitioned mesh. From these three points on the substrate, normal lines are extended vertically upward. Three points at which these normal lines intersect with the film surface are referred to as A, B and C. The angle θ between the normal line DD' from the plane of the triangle ABC and the normal line DO' extending vertically upward from the substrate is defined as the tilt angle.

Figure 1C:
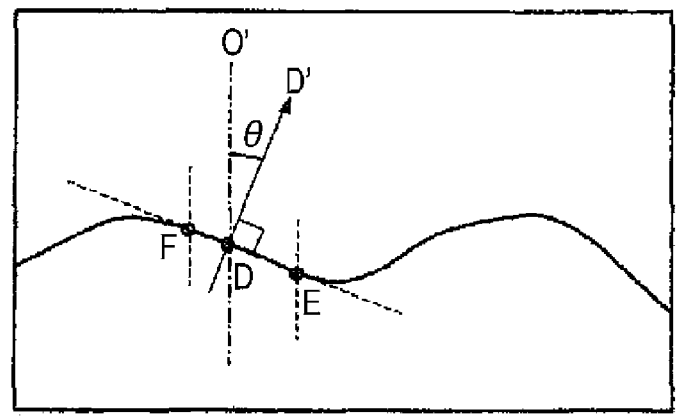

FIG. 1C is a cross-sectional view of the film cut through at the plane P including the points O', D and D' therein. The segment EF is an intersection line of the triangle ABC and the plane P.

In the invention, it is preferable that the area to be measured on the substrate is at least 250,000 square micrometers (0.25 square millimeters), more preferably 0.25 square millimeters or more but not more than 1.0 square millimeters from the standpoint of establishing both of desirable measurement accuracy and measurement efficiency. It is also preferable that the area of the triangle employed as a measurement unit is from 0.5 to 2 square micrometers from the standpoint of assuring measurement accuracy.

Although several devices usable for these measurements have been known, Model SXM520-AS150 made by Micromap Corporation (USA) is employed in the invention. This device comprises a light source that is a halogen lamp having an interference filter with a central wavelength of 560 nm inserted thereinto, and an object lens having 2.5- to 50-magnification. Data intake is performed with a ⅔ inch CCD having pixels of 640×480, which is a standard equipment of the device. In the invention, the measurement unit for the tilt angle is set to 0.8 square micrometers and the area to be measured is set to 500,000 square micrometers (0.5 square millimeters), in the case where the object lens has 10-magnification. If desired, the magnification of the objective lens can be increased and, in its turn, the measurement unit and the area to be measured can be decreased. The measurement data is analyzed by using a software program, for example, MATLAB made by Math Works, Inc. (USA), and the distribution of tilt angles can be calculated. The results of the measurements made on such a specified area are assumed to be results regarding tilt angles on the whole film surface. Thus the proportion of tilt angles (integrated value) of 0.05 to 0.25° and the proportion of tilt angles (integrated value) of 1.5 to 2.5° can be easily determined with ease. In the invention, intervals between the tilt angles are set to about as 0.01°.

In the invention, the integrated frequency value of tilt angles ranging from 0.05 to 0.25° is 10% or more but not more than 25% and the integrated frequency value of tilt angles ranging from 1.5 to 2.5° is also 10% or more but not more than 25%. It is preferable that the integrated frequency value of tilt angles ranging from 0.05 to 0.25° is 13% or more but not more than 25% and still preferably 16% or more but not more than 25%. It is preferable that the integrated frequency value of tilt angles ranging from 1.5 to 2.5° is 13% or more but not more than 25% and still preferably 16% or more but not more than 25%. When the integrated frequency value of tilt angles ranging from 0.05 to 0.25° is less than 10%, it becomes impossible to assure a sufficient effect of preventing the formation of reflected images caused by lighting fixtures in a larger room such as a station or airport waiting room. When the integrated frequency value exceeds 25%, the specular reflection component (the component having tilt angle of 0°) also increases, which is undesirable as an antiglare optical film.

When the integrated frequency value of tilt angles ranging from 1.5 to 2.5° is less than 10%, it becomes impossible to assure a sufficient effect of preventing the formation of reflected images caused by a lighting fixture placed at a relatively close distance as, for example, at home. When the integrated frequency value exceeds 25%, on the other hand, undesirable white blur arises. These findings are obtained as the results of simulated environmental experiments. Since a lighting fixture is placed relatively closely to the display at home, it is reflected onto the display. Thus, the estimated angle thereof is relatively large. Namely, it is expected that reflected lights can be effectively scattered on the surface which comprises a specific amount of the components having tilt angles of 1.5 to 2.5°.

In a larger room such as a station or airport waiting room, lighting fixtures are placed relatively far from the display and, therefore, the lighting fixtures are reflected onto the display as line or point light sources. Thus, the estimated angles thereof are relatively small. Namely, it is expected that reflected lights can be effectively scattered on the surface which comprises a specific amount of the components having tilt angles of 0.0.5 to 0.25°.

In the invention, it is particularly preferable that the integrated frequency value of tilt angles ranging from 0.05 to 0.25° is 16% or more but not more than 25% and the integrated frequency value of tilt angles ranging from 1.5 to 2.5° is also 16% or more but not more than 25%. Owing to this, it becomes possible to prevent both the formation of reflected images caused by reflection of external light and white blur under various using environments, i.e., from at home to larger rooms such as station or airport waiting rooms.

As methods for achieving the integrated frequency values of the specific tilting angles in the invention, there can be enumerated a method wherein a layer having particles dispersed in a light-transmitting resin matrix is formed on a transparent substrate, a method wherein a resin solution is coated and Benard cells are formed in the course of drying, a method wherein a layer made of multiple incompatible polymer materials having been phase-separated is formed, a method wherein emboss patterning is conducted followed by curing, and so on. Although the antiglare optical film according to the invention may be formed by any method without restriction so long as such surface shape as achieving the integrated frequency values of the specific tilt angles can be obtained, it is preferable from the standpoint of productivity to form it by the method wherein a layer having particles dispersed in a light-transmitting resin matrix is formed.

So long as the tilting angles ranging from 0.05 to 0.25° and 1.5 to 2.5° fall within the scopes as specified above in the invention, the distribution of other angles is not particularly restricted. In the embodiment of using an antiglare layer having particles dispersed in a light-transmitting resin matrix, it is preferable that the integrated frequency value of tilt angles higher than 0.25° but lower than 1.5° is 0% or more but not more than 80%, more preferably 20% or more but not more than 75%, and most preferably 40% or more but not more than 65%. By regulating the value within the range as defined above, the antiglare properties can be almost uniformly exerted on various light sources placed at short to long distances, which makes it possible to give a more natural sensation. It is also preferable that the integrated frequency value of tilt angles higher than 2.5° is 20% or lower and more preferably 15% or lower. When this value exceeds 20%, there arises a tendency toward serious white blur. Moreover, it is preferable that the integrated frequency value of tilt angles 10° or higher is less than 1.0% and more preferably less than 0.8%. By regulating this value at a low level, an antiglare film with little white blur can be obtained.

In the tilt angle distribution as discussed above, it is required that the lower angle side of 0.05 to 0.25° and the hither angle side of 1.5 to 2.5° both fall within the respective ranges as defined above. In the embodiment of using an existing antiglare layer having particles dispersed in a light-transmitting resin matrix, the frequencies in the lower and higher angle sides can be hardly regulated within the specific ranges as defined in the invention by controlling the absolute heights/depths of the concavity and convexity. When it is attempted to achieve the specific distribution according to the invention by controlling the peak angle values of the tilt angle distribution, the frequencies in the higher angle side excessively decreases with an increase in the frequencies in the lower angle side whereas the frequencies in the higher angle side excessively increases with a decrease in the frequencies in the lower angle side, which makes it difficult to achieve the desired distribution.

[Layer Constitution of Optical Film]

The optical film according to the invention has at least one antiglare layer on a transparent substrate. As the antiglare layer, an embodiment wherein light-transmitting particles are dispersed in a resin matrix is preferred. However, the invention is not restricted thereto so long as the surface has the concavo-convex shape as described above is satisfied. The antiglare layer may consist of either a single layer or a plurality of layers, for example, two to four layers. In addition to the antiglare layer, the optical film according to the invention may be equipped with functional layer(s). Examples of these layers include a hard coat layer, an antistatic layer, a low refractive index layer, an antifouling layer and so on. It is more preferable that the antiglare layer also serves as a hard coat layer, an antistatic layer, an antifouling layer, etc.

Next, examples of the preferable layer constitution of the optical film according to the invention will be presented. In the following constitutions, a base film means a transparent substrate made of a film.

Base film/antiglare layer

Base film/antistatic layer/antiglare layer

Base film/antiglare layer/low refractive index layer

Base film/antiglare layer/antistatic layer/low refractive index layer

Base film/hard coat layer/antiglare layer/low refractive index layer

Base film/hard coat layer/antiglare layer/antistatic layer/low refractive index layer Base film/hard coat layer/antistatic layer/antiglare layer/low refractive index layer Base film/antiglare layer/high refractive index layer/low refractive index layer Base film/antiglare layer/medium refractive index layer/high refractive index layer/low refractive index layer Antistatic layer/base film/antiglare layer/medium refractive index layer/high refractive index layer/low refractive index layer Base film/antistatic layer/antiglare layer/medium refractive index layer/high refractive index layer/low refractive index layer Antistatic layer/base film/antiglare layer/high refractive index layer/low refractive index layer/high refractive index layer/low refractive index layer From the viewpoint of regulating reflection, an antireflective film having a constitution including a medium refractive index layer/a high refractive index layer/a low refractive index layer is preferred. For example, constitutions disclosed in JP-A-8-122504, JP-A-8-110401, JP-A-10-300902, JP-A-

2002-243906 and JP-A-2000-111706 may be cited. From the viewpoints of convenience in production and productivity, the best embodiment in the invention includes an antiglare optical film having a single-layer antiglare layer on the substrate and an antiglare optical film having an antiglare layer and a low refractive index layer on the substrate in this order.

[Constitution of Antiglare Layer]

The antiglare layer is a layer that is formed by, for example, coating a coating solution containing light-transmitting particles, a resin matrix-forming component (a binder monomer, etc.) and an organic solvent and then drying and curing the same. More specifically speaking, the antiglare layer-forming composition contains a monomer for forming the resin matrix, which is cured by, for example, ionizing radiation to form the resin matrix, the light-transmitting particles as described above and a polymerization initiator preferably together with a high-molecular compound for adjusting the viscosity of the coating solution, a curl reducing agent, an inorganic fine particular filler for controlling the refractive index, a coating aid and so on. The thickness of the antiglare layer is preferably from 3 μm to 40 μm, more preferably from 7 μm to 30 μm and most preferably from 10 μm to 20 μm. When the thickness is less than 3 μm, the concavo-convex shape becomes too steep or the hardness (for example, pencil hardness) of the film is lowered in some cases. When the thickness exceeds 40 μm, the concavo-convex shape becomes too gentle or there arise some troubles such as curling or a too large load in drying and film-forming, thereby bringing about an undesirable tendency.

[Light-Transmitting Particles in Antiglare Layer]

To provide the concavo-convex surface shape in the invention, it is preferable that the average particle diameter of the light-transmitting particles is from 3 μm to 20 μm, more preferably from 6 μm to 15 μm and most preferably from 6 μm to 10 μm. In the invention, the average particle diameter means the primary particle diameter. When it is intended to form the desires surface shape by using particles having an average particle diameter less than 3 μm, it is unavoidable to decrease the antiglare layer thickness to some extent, which is liable to bring about the problems as described above. When it is intended to form the desires surface shape by using particles having an average particle diameter exceeding 20 μm, on the other hand, it is unavoidable to increase the antiglare layer thickness to some extent, which is also liable to bring about the problems as described above. The refractive index of the light-transmitting particles contained in the antiglare layer is preferably from 1.53 to 1.60 and more preferably from 1.55 to 1.58.

As a method for controlling the concavo-convex surface shape within the range as defined in the invention, it is preferable to use two or more kinds of particles having different average particle diameters from each other or two or more kinds of particles having different refractive indexes from each other.

In the case of using two or more kinds of particles having different average particle diameters from each other, the difference in average particle diameter between larger particles and smaller particles is preferably 0.5 to 5.0 μm and more preferably 1.0 to 3.0 μm.

Although the reason why it is preferable to use two or more kinds of particles having different refractive indexes from each other has never been clarified, such particles differing in refractive index are also different in surface conditions from each other and, therefore, show different aggregation/dispersion behaviors in the resin matrix. Owing to the coexistence of particles easily undergoing aggregation with particles having a (slightly) different refractive index and hardly undergoing aggregation, the surface conditions of the coated antiglare layer can be delicately controlled. In the case of using particles differing in refractive index for regulating the surface shape, the difference in refractive index between the particles is preferably 0.03 to 0.12 and most preferably 0.06 to 0.09.

As a controlling method, it is also effective to use two or more kinds of particles differing in average particle diameter from each other as described above, since these particles form concavity and convexity with different tilt angles.

Examples of the resin particles include crosslinked polymethyl methacrylate particles, crosslinked methyl methacrylate-styrene copolymer particles, crosslinked polystyrene particles, crosslinked methyl methacrylate-methyl acrylate copolymer particles, crosslinked acrylate-styrene copolymer particles, melamine/formaldehyde resin particles, benzoguanamine/formaldehyde resin particles and so on. Among them, crosslinked styrene particles, crosslinked polymethyl methacrylate particles, crosslinked methyl methacrylate-styrene copolymer particles are preferable. Examples of the resin particles further include surface-modified particles in which a compound having a fluorine atom, a silicon atom, a carboxyl group, a hydroxyl group, an amino group, a sulfonate group, a phosphate group, etc. is chemically bonded to the surface of such resin particles and particles in which nano-sized inorganic microparticles of silica, zirconia, etc. are bonded to the surface.

As the light-transmitting particles, inorganic microparticles may be preferably employed. Examples of the inorganic microparticles include silica particles, alumina particles and so on and silica particles are particularly preferably usable.

To obtain a sufficient surface hardness (for example, pencil hardness) as will be described hereinafter, it is preferable the antiglare optical film according to the invention has an antiglare layer formed by curing a monomer by ionizing radiation. In a binder matrix made of such an ionizing radiation monomer, it has been experimentally disclosed that styrene-rich particles would be more strongly aggregated while acryl-rich particles would be more strongly dispersed. By utilizing these phenomena, the antiglare properties can be controlled. To obtain the antiglare film having the surface shape according to the invention, the composition, refractive index, etc. of the particles are not specifically restricted. However, it is preferable from the viewpoint of easiness in formation to use at least one kind of crosslinked methyl methacrylate-styrene copolymer particles having a refractive index of 1.55 to 1.58. Because of having appropriate aggregation properties, these particles form concavity and convexity of large intervals due to the aggregation properties thereof and thus the tilt angles in the concavo-convex surface shape can be achieved.

To obtain the desired concavo-convex surface shape in the invention, it is preferable that the ratio (D/d) of the average particle diameter (D) of the light-transmitting particles in the antiglare layer to the thickness (d) of the antiglare layer ranges from 0.25 to 0.75, more preferably from 0.30 to 0.70 and most preferably from 0.35 to 0.65. The (d-D) value preferably ranges from 1.0 to 30 μm, more preferably from 2.0 to 15 μm and most preferably from 3.0 to 10 μm. The content of the light-transmitting particles in the antiglare layer is preferably from 5 to 20% by mass based on the total solid matters in the antiglare layer, and more preferably 7 to 15% by mass. The effects of the invention of preventing the formation of reflected images caused by reflection of external light and preventing white blur can be both established by using the particles, which have appropriate aggregation properties and satisfy the relationships between the particle diameter and layer thickness within definite ranges, and coating at a specific concentration.

It is preferable that the average particle diameter (D) of the light-transmitting particles in the antiglare layer and the thickness (d) of the antiglare layer satisfy the following formulae (1) to (3):

$$7 \leq d \leq 30 \ (\mu m) \quad \text{Formula (1)}$$

$$0.25 \leq (D/d) \leq 0.75 \quad \text{Formula (2)}$$

$$2.0 \leq (d-D) \leq 15 \ (\mu m). \quad \text{Formula (3)}$$

In the course of intensive studies, it has been also clarified that using a controlling procedure of mixing a thermoplastic resin and an ionizing radiation monomer having a difference in hydrophilic/hydrophobic nature from the particle surface is preferable in the embodiment of the invention.

The refractive index of the light-transmitting particles can be determined by dispersing the equal amount of the light-transmitting particles in solvents, which are prepared by mixing two kinds of solvents having different refractive indexes at various mixing ratios so as to give various refractive indexes, measuring the turbidities, and measuring the refractive index with an Abbe refractometer at the point when the turbidity attains the minimum level.

Referring a particle having a particle diameter larger by 20% or more than the average particle diameter as to a large particle, it is preferable that the proportion of such large particles is 1% or less based on the total particle count, more preferably 0.1% or less and more preferably 0.01% or less. Particles having such a particle diameter can be obtained by classifying the particles during or after a common synthesis reaction. By increasing the classification frequency or conducting the classification at a higher level (classification conditions), particles with a preferred distribution can be obtained.

The particle diameter distribution is measured with a Coulter counter and then the distribution thus measured is converted into particle count distribution. The average particle diameter is calculated from the particle count distribution.

[Binder for Forming Resin Matrix of Antiglare Layer]

As the binder for forming the main resin matrix constituting the antiglare layer, it is preferable to use a light-transmitting polymer having a saturated hydrocarbon chain or a polyether chain as the main chain after curing by, for example, ionizing radiation. It is also preferable that the main binder polymer after the curing has a crosslinked structure.

As the binder polymer having a saturated hydrocarbon chain as the main chain after curing, an ethylenically unsaturated monomer selected from the compounds belonging to the following group 1 and a polymer thereof are preferred. As the binder polymer having a polyether chain as the main chain, an epoxy-type monomer selected from the compounds belonging to the following group 2 and a polymer formed by ring-opening polymerization thereof are preferred. Moreover, use is preferably made of a polymer of a mixture of these monomers. Next, these compounds will be illustrated in greater detail.

(Compounds of Group 1)

As the binder polymer having a saturated hydrocarbon chain as the main chain and a crosslinked structure, a (copolymer of monomer(s) having two or more ethylenically unsaturated bonds is preferable.

To achieve a high refractive index, it is possible to select a monomer having an aromatic ring or at least one atom selected from among halogen atoms other than fluorine, i.e., sulfur atom, phosphorus atom and nitrogen atom in its structure.

Examples of the monomer having two or more ethylenically unsaturated bonds to be used for forming the antiglare layer include esters of polyhydric alcohol with (meth) acrylic acid (for example, ethylene glycol di(meth)acrylate, 1,4-cyclohexanediacrylate, pentaerythritol tetra(meth)acrylate, pentaerythritol tri(meth)acrylate, trimethylolpropane tri (meth)acrylate, trimethylolethane tri (meth)acrylate, dipentaerythritol tetra (meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate and polyester polyacrylate), divinyl benzene and its derivatives (for example, 1,4-divinyl benzene, 4-vinylbenzoic acid-2-acryloylethyl ester and 1,4-divinyl cyclohexanone), vinyl sulfones (for example, divinyl sulfone), and acrylamide derivatives (for example, methylenebis(meth)acrylamide). From the viewpoints of reducing shrinkage caused by curing and preventing curling, it is preferable to broaden the interval between crosslinking points by adding ethylene oxide, propylene oxide or caprolactone. Namely, use may be preferably made of, for example, trimethylolpropane triacrylate having ethylene oxide added thereto (for example, V#360 manufactured by OSAKA ORGANIC CHEMICAL INDUSTRY, Ltd.), triacrylate having glycerol propylene oxide added thereto (for example, V#GPT manufactured by OSAKA ORGANIC CHEMICAL INDUSTRY, Ltd.), dipentaerythritol hexaacrylate having caprolactone added thereto (for example, DPCA-20 and 120 manufactured by NIPPON KAYAKU Co., Ltd.) and so on. Two or more kinds of these monomers having two or more ethylenically unsaturated groups may be used together.

Moreover, there can be enumerated resins having two or more ethylenically unsaturated groups such as relatively low-molecular weight polyester resins, polyether resins, acrylic resins, epoxy resins, urethane resins, alkyd resins, spiroacetal resins, polybutadiene resins and polythiol polyene resins, and oligomers or prepolymers of polyfunctional compounds such as polyhydric alcohols. It is also possible to use two or more kinds of these monomers. The content of the resin(s) having two or more ethylenically unsaturated groups is preferably from 10 to 100% based on the total amount of the binder.

Such a monomer having ethylenically unsaturated bonds can be polymerized by ionizing radiation or heating in the presence of a photo radical polymerization initiator or a heat radical polymerization initiator. That is to say, a coating solution, which contains the monomer having ethylenically unsaturated bonds, a photo radical polymerization initiator or a heat radical polymerization initiator and light-transmitting particles optionally together with an inorganic filler, a coating aid, other additives, an organic solvent and so on, is prepared. Then the coating solution is applied to the transparent substrate and cured by polymerization under ionizing radiation or heating. Thus, the antiglare layer can be formed. It is also preferable to conduct both of ionizing radiation curing and heat curing. As the photo and heat radical polymerization initiators, use can be made of various marketed compounds that are presented in *Saishin UV Koka Gijutsu* (*New UV Curing Technology*), (p. 159, publisher: Kazuhiro Takausu, publishing office: GIJUTSU KYOKAI K.K., 1991) a catalogue published by Ciba Special Chemicals.

(Compounds of Group 2)

In order to reduce curing shrinkage of the cured film, it is preferred to use an epoxy compound as will be described hereinafter. As the monomers having epoxy groups, monomers having two or more epoxy groups per molecule are preferred. Examples thereof include epoxy monomers described in JP-A-2004-264563, JP-A-2004-264564, JP-A-2005-37737, JP-A-2005-37738, JP-A-2005-140862, JP-A-2005-140863 and JP-A-2002-322430.

To reduce curing shrinkage, the content of the monomers having epoxy groups (preferably epoxy resins having two or more epoxy group per molecule) is preferably from 20 to 100% by mass, more preferably from 35 to 100% by mass and still more preferably from 50 to 100% by mass, based on the mass of the total binder constituting the layer.

As the photo acid generator for generating cation by the action of light to be used to polymerize the epoxy monomers and compounds, there are enumerated ionic compounds such as triarylsulfonium salts and diaryliodonium salts, and non-ionic compounds such as nitrobenzyl sulfonate. For this purpose, use can be made of various known photo acid generators such as those which are described in *Imejinguyo Yuki Zairyo (Organic materials for imaging)*, compiled by Yuki Erekutoronikusu Zairyo Kenkyukai and published by Bunsin Shuppansha in 1997. Among these compounds, sulfonium salts or iodonium salts are particularly preferred, and preferable examples of the counter ion are $PF_6^-$, $SbF_6^-$, $AsF_6^-$ and $B(C_6F_5)_4^-$ and so on.

The polymerization initiator is used in an amount ranging from 0.1 to 15 parts by mass, more preferably from 1 to 10 parts by mass, per 100 parts by mass of the compound of group 1 or 2.

[Other High-Molecular Compound in Antiglare Layer]

The antiglare layer according to the invention may contain other high-molecular compound(s). By adding the high-molecular compound, curing shrinkage can be reduced and the viscosity of the coating solution can be adjusted.

Such a high molecular compound has already formed a polymer in the step of adding to the coating solution. Examples of the high-molecular compound include cellulose esters (for example, cellulose triacetate, cellulose diacetate, cellulose propionate, cellulose acetate propionate, cellulose acetate butyrate, cellulose nitrate, etc.), urethane acrylates, polyester acrylates, (meth)acrylates (for example, methyl methacrylate/methyl (meth)acrylate copolymer, methyl methacrylate/ethyl (meth)acrylate copolymer, methyl methacrylate/butyl (meth)acylate copolymer, methyl methacrylate/styrene copolymer, methyl methacrylate/(meth)acrylic acid copolymer, polymethyl methacrylate, etc.) and resins (for example, polystyrene).

From the standpoint of developing the effect of reducing curing shrinkage and the effect of increasing viscosity of the coating solution, the content of the high molecular compound is preferably from 1 to 50% by mass and more preferably from 5 to 40% by mass, based on the total amount of the binders contained in the layer containing the high molecular compound.

The mass-average molecular weight of the high molecular compound is preferably from 3,000 to 400,000, more preferably from 5,000 to 300,000 and still more preferably from 5,000 to 200,000. It is also possible to use the high molecular compound as a surface shape controlling agent. It is particularly effective and preferable to use cellulose esters in controlling the surface shape. To control the surface shape, it is preferable to use 0.5 to 3.0% by mass, based on the total solid matters in the antiglare layer, of the high molecular compound, more preferably 0.6 to 2.0% by mass and most preferably 0.6 to 1.5% by mass.

The refractive index of the antiglare layer preferably ranges from 1.47 to 1.70 and more preferably from 1.47 to 1.65. In the case of providing a low refractive index layer as will be described hereinafter on the antiglare layer, the refractive index of the antiglare layer preferably ranges from 1.54 to 1.70 and more preferably from 1.58 to 1.65 from the viewpoint of reducing the refractive index, though reflected light is somewhat strongly colored. In the case wherein the refractive index of the low refractive index layer is 1.40 or less and the low refraction performance is high or in the embodiment wherein no refractive index is provided on the antiglare layer, the refractive index of the antiglare layer preferably ranges from 1.47 to 1.54 and more preferably from 1.48 to 1.53.

[Inorganic Filler of Antiglare Layer]

In addition to the light-transmitting particles as described above, it is possible that the antiglare layer contains an inorganic filler in order to control the refractive index, control the membrane strength, reduce curing shrinkage and, in the case of forming the low refractive index layer, to reduce a decrease in the refractive index. For example, it is preferable that the antiglare layer contains a micro-sized inorganic filler having a high refractive index which comprises oxide of at least one metal selected from among titanium, zirconium, aluminum, indium, zinc, tin and antimony and has an average particle size of the primary particles of 0.2 μm or less, preferably 0.1 μm or less and still preferably 0.06 μm or less but not less than 1 nm.

To regulate the difference in refractive index between from the light-transmitting particles, it is also possible to use a micro-sized inorganic filler having a low refractive index such as silica microparticles or hollow silica microparticles as the inorganic filler in the case where it becomes necessary to reduce the refractive index of the resin matrix. The preferable particle diameter thereof is the same as the micro-sized inorganic filler having a high refractive index light-transmitting particles having a high refractive index as described above.

It is also preferable that the inorganic filler is surface-treated by silane coupling or titanium coupling. Use is preferably made of a surface-treating agent having a functional group capable of reacting with the binder species on the filler surface.

The content of such a micro-sized inorganic filler is preferably from 10 to 90% by mass based on the total mass of the antiglare layer, still preferably from 20 to 80% by mass and particularly preferably from 30 to 75% by mass.

Because of having a particle size sufficiently smaller than the light wavelength, the micro-sized inorganic filler causes no scattering. Therefore, a dispersion having the filler dispersed throughout the binder polymer behaves as an optically homogeneous substance.

[Surfactant in Antiglare Layer]

To assure surface evenness by preventing coating unevenness, drying unevenness, spot defects and so on, it is preferable that either or both of fluorine-containing and silicone-based surfactants are added to the coating composition for the antiglare layer. It is particularly preferable to use a fluorine-containing surfactant which exerts effects of improving surface defects such as coating unevenness, drying unevenness, spot defects and so on in the optical film according to the invention even in a smaller addition amount. An object of the addition of the surfactant is to impart suitability for high-speed coating while elevating the surface evenness to thereby improve the productivity.

Preferable examples of the fluorine-containing surfactant include the compounds (fluorine-containing polymers) disclosed in, for example, JP-A-2007-188070, paragraphs [0049] to [0074].

The preferable content of the fluorine-containing polymer in the antiglare layer of the invention ranges from 0.001 to 5% by mass based on the coating solution, preferably from 0.005 to 3% by mass and more preferably 0.01 to 1% by mass. In the case where the fluorine-containing polymer is added in an amount of 0.001% by mass or more, a sufficient effect can be obtained. By regulating the amount thereof to 5% by mass or less, the coating film can be sufficiently dried and thus favorable performance (for example, refractive index and scratch resistance) can be obtained.

[Organic Solvent of Coating Solution for Antiglare Layer]

The coating solution for forming the antiglare layer may contain an organic solvent.

Examples of the organic solvent include, as the alcohol type, methanol, ethanol, n-propanol, isopropanol, n-butanol, isobutanol, secondary butanol, tertiary butanol, isoamyl alcohol, 1-pentanol, n-hexanol, methyl amyl alcohol and so on; as the ketone type, methyl isobutyl ketone, methyl ethyl ketone, diethyl ketone, acetone, cyclohexanone, diacetone alcohol and so on; as the ester type, methyl acetate, ethyl acetate, n-propyl acetate, isopropyl acetate, isobutyl acetate, n-butyl acetate, isoamyl acetate, n-amyl acetate, methyl propionate, ethyl propionate, methyl butyrate, ethyl butyrate, methyl acetate, methyl lactate, ethyl lactate and so on; as the ether or acetal type, 1,4-dioxane, tetrahydrofuran, 2-methylfuran, tetrahydropyrane, diethylacetal and so on; as the hydrocarbon type, hexane, heptane, octane, isooctane, ligroin, cyclohexane, methylcyclohexane, toluene, xylene, ethylbenzene, styrene, divinylbenzene and so on; as the hydrocarbon halide type, carbon tetrachloride, chloroform, methylene chloride, ethylene chloride, 1,1,1-trichloroethane, 1,1,2-trichloroethane, trichloroethylene, tetrachloroethylene, 1,1,1,2-tetrachloroethane and so on; as the polyhydric alcohol or its derivative type, ethylene glycol, ethylene glycol monomethyl ether, ethylene glycol monoethyl ether, ethylene glycol monoacetate, diethylene glycol, propylene glycol, dipropylene glycol, butanediol, hexylene glycol, 1,5-pentadiol, glycerol monoacetate, glycerol ethers, 1,2,6-hexanetriol and so on; as the fatty acid type, formic acid, acetic acid, propionic acid, butyric acid, isobutyric acid, isovaleric acid, lactic acid and so on; as the nitrogen-containing compound type, formamide, N,N-dimethylformamide, acetamide, acetonitrile and so on; and as the sulfur-containing compound type, dimethylsulfoxide and so on. Among them, methyl isobutyl ketone, methyl ethyl ketone, cyclohexanone, acetone, toluene, xylene, ethyl acetate, 1-pentanol, etc. are particularly preferred.

To control the aggregation properties, use may be appropriately made of a mixture with a polyhydric alcohol type solvent.

The organic solvent as discussed above may be used either singly or as a mixture. The total content of the organic solvent(s) in the coating composition is preferably from 20% by weight to 90% by weight, more preferably from 30% by weight to 80% by weight and most preferably from 40% by weight to 70% by weight. To stabilize the surface shape of the antiglare layer, it is preferable to use a combination of a solvent having a boiling point of lower than 100° C. with another solvent having a boiling point of 100° C. or higher.

[Curing of Antiglare Layer]

The antiglare layer is preferably formed by conducting, after coating the coating solution on the support, irradiation with light or electron beams or heating treatment to thereby cause cross-linking or polymerization reaction. In the case of conducting irradiation with UV rays, UV rays emitted from a light source such as a super-high pressure mercury lamp, a high pressure mercury lamp, a low pressure mercury lamp, a carbon arc, a xenon arc or a metal halide lamp can be utilized. Curing with UV rays is conducted at an oxygen concentration of preferably 4% by volume or less, more preferably 2% by volume or less and most preferably 0.5% by volume or less, under purging with nitrogen.

Next, layers available as the constituting layers of the optical film according to the invention in addition to the antiglare layer will be illustrated.

[Low Refractive Index Layer]

To reduce the refractive index of the optical film according to the invention, it is preferable to use a low refractive index layer. The refractive index of the low refractive index layer is preferably from 1.20 to 1.46, more preferably from 1.25 to 1.46 and particularly preferably from 1.30 to 1.40.

The thickness of the low refractive index layer is preferably from 50 to 200 nm and more preferably from 70 to 100 nm. The haze of the low refractive index layer is preferably 3% or less, more preferably 2% or less and most preferably 1% or less.

Examples of the embodiment of the cured composition preferable for forming the low refractive index layer are as follows: (1) a composition containing a fluorine-containing compound having a crosslinkable or polymerizable functional group; (2) a composition containing a hydrolysis condensate of a fluorine-containing organosilane material as the main component; and (3) a composition containing a monomer having two or more ethylenically unsaturated groups and inorganic microparticles having a hollow structure.

(1) Composition Containing Fluorine-Containing Compound Having Crosslinkable or Polymerizable Functional Group As the fluorine-containing compound having a crosslinkable or polymerizable functional group, there can be enumerated a copolymer of a fluorine-containing monomer with a monomer having a crosslinkable or polymerizable functional group. Specific examples of such fluorine-containing monomer are disclosed in JP-A-2003-222702, JP-A-2003-183322, etc.

The above-described polymer may be optionally used together with a curing agent having a polymerizable unsaturated group as disclosed in JP-A-2000-17028. As disclosed in JP-A-2002-145952, combined use together with a fluorine-containing compound having a polyfunctional polymerizable unsaturated group is also preferred. As examples of the compound having a polyfunctional polymerizable unsaturated group, the above-described monomers having two or more ethylenically unsaturated groups can be cited. Also, organosilane hydrolysis condensates disclosed in JP-A-2004-17091 are preferable and organosilane hydrolysis condensates having (meth)acryloyl group are particularly preferable. It is particularly preferable to use such a compound in the case of using a polymerizable unsaturated group-containing compound in the polymer, since a remarkable effect of improving scratch resistance can be established by the combined use.

In the case where the polymer per se has no sufficient curing properties when employed alone, the required curing properties can be imparted by blending a crosslinkable compound. When the polymer per se contains hydroxyl group, for example, it is preferable to use various amino compounds as a curing agent. An amino compound usable as a crosslinkable compound is, for example, a compound having two or more hydroxyalkylamino and/or alkoxyalkylamino groups. Specific examples thereof include melamine compounds, urea-containing compounds, benzoguanamine compound, glycoluryl compounds and so on. To cure these compounds, it is preferable to use an organic acid or its salt.

(2) Composition Containing Hydrolysis Condensate of Fluorine-Containing Organosilane Material as the Main Component Also, a composition containing a hydrolysis condensate of a fluorine-containing organosilane compound as the main component is preferable because of having a low refractive index and a high coating film surface hardness. A condensation product of a compound having hydrolyzable silanol at one or both ends to a fluoroalkyl group with a tetraalkoxysilane is preferred. Specific examples of the composition are disclosed in JP-A-2002-265866 and JP-A-2002-317152.

(3) Composition Containing Monomer Having Two or More Ethylenically Unsaturated Groups and Inorganic Microparticles Having Hollow Structure As still another preferable embodiment, a low refractive index layer comprising particles having a refractive index and a binder may be cited. Although the refractive index particles may be either organic or inorganic ones, particles having voids inside are preferred. As specific examples of the hollow particles, silica-based particles are disclosed in JP-A-2002-79616. The refractive index of the particles is preferably from 1.15 to 1.40 and more preferably from 1.20 to 1.30. As the binder, the monomers having two or more ethylenically unsaturated groups that are enumerated above concerning the antiglare layer may be cited.

It is preferable that the low refractive index layer contains the polymerization initiator as described above. In the case where the low refractive index layer contains a radical polymerizable group, use can be made of from 1 to 10 parts by mass and preferably from 1 to 5 parts by mass of the polymerization initiator based on the compound.

The low refractive index layer may also contain inorganic particles. To impart a scratch resistance, it is possible to use inorganic microparticles having a particle diameter corresponding to 15% to 150%, preferably 30% to 100% and more preferably 45% to 60% of the thickness of the low refractive index layer.

To impart various characteristics such as antifouling properties, water tolerance, chemical tolerance and slipperiness, the low refractive index layer may optionally contain a publicly known polysiloxane- or fluorine-based antifouling agent, a slipperiness-imparting agent and so on.

The integrating sphere-measured reflectivity (the average of the values measured at 450 nm to 650 nm, as will be described hereinafter) of the antireflective and antiglare optical film having the low refractive index layer is preferably less than 3.0%, and more preferably less than 2.0% but not less than 0.3%. By reducing the integrated reflectivity, sufficient antiglare properties can be obtained even in the case of regulating the light scattering on the surface of the antiglare optical film and thus an antireflective and antiglare optical film showing excellent definitiveness in black color can be obtained.

[Transparent Substrate]

As the transparent substrate in the optical film, it is preferable to employ a plastic film. Examples of the polymer constituting the plastic film include cellulose esters (for example, triacetylcellulose and diacetyl cellulose typified by FUJITAC TD80U and FUJITAC TD80UF, manufactured by FUJI PHOTOFILM Co., Ltd., etc.), polyamides, polycarboantes, polyesters (for example, polyethylene terephthalate, polyethylene naphthalate, etc.), polystyrenes, polyolefins, norbornene resins (for example, ARTON manufactured by JSR), amorphous polyolefins (for example, ZEONEX manufactured by ZEON), (meth)acrylic resins (ACRYPET VRL20A manufactured by MITSUBISHI RAYON Co., Ltd. and cyclic structure-containing acrylic resins disclosed in JP-A-2004-70296 and JP-A-2006-171464) and so on. Among these materials, triacetyl cellulose, polyethylene terephthalate and polyethylene naphthalate are preferable and triacetylcellulose is particularly preferable.

Although the thickness of the transparent substrate is not particularly restricted, it preferably ranges from 10 to 200 µm, more preferably from 20 to 100 µm and particularly preferably from 30 to 80 µm. From the standpoint of handling, the substrate width is preferably 1 m or longer but not longer than 5 m, while the substrate length is preferably 500 m or longer but not more than 5000 m.

In using the optical film according to the invention in a liquid crystal display device, it is provided as the outermost face of the display by, for example, forming an adhesive layer on one face. The optical film is employed at least as a protective film in the side opposite to the liquid crystal cell of a polarizing plate in the side opposite to the liquid crystal cell. In the case where the transparent substrate is made of triacetylcellulose, triacetylcellulose is employed as a protective film for protecting the polarizing layer of the polarizing plate. Therefore, it is also favorable from the viewpoint of cost to employ the above-described optical film as such as a protective film.

In the case where the optical film is provided with an adhesive layer on one face and employed as the outermost face of a display or as a protective film as such, it is preferable to conduct a saponification treatment after forming the outermost layer on the transparent substrate. The saponification can be carried out by a publicly known procedure, for example, dipping the film in an alkali solution for an appropriate time. After dipping in the alkali solution, it is preferable to sufficiently wash the film with water or neutralize the alkali component by dipping in a dilute acid, thereby eliminating the alkali component remaining in the film. Owing to the saponification treatment, the surface of the transparent substrate in the side opposite to the side having the outermost layer becomes hydrophilic.

[Coating Method]

The optical film can be formed by the following methods, though the invention is not restricted thereto.

First, coating solutions containing components for forming the individual layers are prepared. Next, these coating solutions for forming the antiglare layer and other functional layers are coated on the transparent substrate by a coating method such as the dip coating method, the air knife coating method, the curtain coating method, the roller coating method, the wire bar coating method, the gravure coating method or the die coating method followed by heating and drying. The microgravure coating method, the wire bar coating method and the die coating method are preferred (see, U.S. Pat. No. 2,681,294 and JP-A-2006-122889) and the die coating method is particularly preferable.

Then, the monomers for forming the antiglare layer and other functional layers are polymerized and cured by photo irradiation or heating. Thus, the antiglare layer and other functional layers are formed. If necessary, a plural number of functional layers may be employed.

Next, the coating solution for forming the low refractive index layer is applied on the antiglare layer or another functional layer and photo irradiated or heated in the same manner (i.e., cured by the radiation with ionizing rays such as UV rays, preferably by the ionizing radiation under heating) to form the low refractive index layer. Thus, the optical film as described above can be obtained.

[Polarizing Plate]

A polarizing plate mainly consists of two protective films that are provided for protecting the both faces in the front and back sides of a polarizing film. It is preferable to use the above-described optical film as at least one of the protective films between which the polarizing film is sandwiched. In the case where the optical film also serves as a protective film, the production cost of the polarizing plate can be reduced. By using the optical film as the outermost layer of the polarizing plate in the viewer's side, the formation of reflected images caused by reflection of external light can be prevented and a polarizing plate being excellent in scratch resistance, antifouling properties and so on can be obtained.

The transparent substrate surface that has been hydrophilicated by the saponification treatment is particularly effective in improving the adhesiveness to a polarizing film comprising polyvinyl alcohol as the main component. Moreover, the hydrophilicated surface is highly resistant to the sticking of dust and debris in the atmosphere and, therefore, effective in preventing spot defects caused by dust and debris. It is preferable that the saponification is conducted so that the contact angle of the transparent substrate surface in the side opposite to the side having the outermost layer to water becomes 40° or less, more preferably 30° or less and most preferably 20° or less.

[Liquid Crystal Display Device]

The optical film as described above is applicable to a liquid crystal display device (LCD).

In the case of using the optical film as one of the surface protective films of a polarizing film, it is preferably usable in liquid crystal display units of transmission, reflection and semi-transmission modes such as twisted nematic (TN), super-twisted nematic (STN), vertical alignment (VA), in-place switching (IPS) and optically compensated bend cell (OCB) modes.

In the invention, it is preferable that the diagonal length of the display screen of the liquid crystal display device is 32 inches or more. In the case where a display is placed in a larger room such as a station or airport waiting room, however, there are sometimes multiple lighting fixtures at short and long distances from the display. By using the liquid crystal display device according to the invention provided with the optical film having the concavo-convex surface shape according to the invention, it becomes possible to stably prevent both of the formation of reflected images and white blur caused by these lighting fixtures placed at short and long distances from the display.

EXAMPLES

To illustrate the invention in greater detail, the following Example will be given. However, it is to be understood that the invention is not restricted thereto. Unless otherwise noted, all "parts" and "percentages" are by mass.

Composition of Coating Solution A-1 for Antiglare Layer

| | |
|---|---:|
| PET-30 (100%) | 228.7 g |
| Viscoat 360 (100%) | 228.7 g |
| Irgacure 127 (100%) | 16.7 g |
| 6 μm Crosslinked acryl particles (1) (30% dispersion) | 35.5 g |
| 6 μm Crosslinked acryl/styrene particles (2) (30% dispersion) | 143.0 g |
| DP-13 (5% solution) | 10.66 g |
| MIBK (methyl isobutyl ketone) | 165.8 g |
| MEK (methyl ethyl ketone) | 129.8 g |
| CAB polymer (20% solution) | 24.0 g |

This coating solution for antiglare layer was filtered through a 30 μm polypropylene filter to thereby prepare a coating solution. In the coating solution, the refractive index of the cured matrix was 1.53.

The particles employed are as follows:

| | |
|---|---|
| 6 μm crosslinked acryl particles (1) | refractive index 1.49 |
| 6 μm crosslinked acryl/styrene particles (2) | refractive index 1.56 |

Composition of Coating Solution L-1 for Low Refractive Index Layer

| | |
|---|---:|
| Fluoropolymer containing ethylenically unsaturated group (1) | 3.9 g |
| Silica dispersion (2) (22%) | 25.0 g |
| Irgacure 127 | 0.2 g |
| DPHA | 0.4 g |
| MEK | 100.0 g |
| MIBK | 45.5 g |

This coating solution for low refractive index layer was filtered through a 1 μm polypropylene filter to thereby prepare a coating solution. After curing, the refractive index of a low refractive index layer formed by coating and curing the coating solution was 1.36.

Composition of Coating Solution L-2 for Low Refractive Index Layer

| | |
|---|---:|
| Fluoropolymer containing ethylenically unsaturated group (1) | 6.0 g |
| MEK-ST-L (30%) | 11.0 g |
| Irgacure 127 | 0.2 g |
| DPHA | 0.5 g |
| MEK | 100.0 g |
| MIBK | 45.5 g |

This coating solution for low refractive index layer was filtered through a 1 μm polypropylene filter to thereby prepare a coating solution. After curing, the refractive index of a low refractive index layer formed by coating and curing the coating solution was 1.44.

The individual compounds employed are as follows.

PET-30: mixture of pentaerythritol triacrylate with pentaerythritol tetraacrylate (manufactured by NIPPON KAYAKU Co., Ltd.).

Viscoat 360: ethylene oxide-denatured trimethylolpropane triacrylate (manufactured by OSAKA ORGANIC CHEMICAL INDUSTRY, Ltd.).

6 μm Crosslinked acryl particles (1) (30% dispersion) MIBK (methyl isobutyl ketone) dispersion prepared by dispersing particles of an average particle diameter of 6 μm (manufactured by SEKISUI PLASTICS Co., Ltd.) in a high-speed agitation machine at 10,000 rpm for 20 min.

6 μm Crosslinked acryl/styrene particles (2) (30% dispersion): MIBK (methyl isobutyl ketone) dispersion prepared by dispersing particles of an average particle diameter of 6 μm (manufactured by SEKISUI PLASTICS Co., Ltd.) in a high-speed agitation machine at 10,000 rpm for 20 min. (Dispersions of other particles were prepared in the same manner.)

CAB polymer: cellulose acetate butylate (20% solution) (531.1: 20% solution) prepared by dissolving 531.1 (manufactured by EASTMAN CHEMICAL Co.) in MIBK in an agitation machine to give a 20% solution.

IRGACURE 127: photo polymerization initiator (manufactured by Ciba Specialty Chemicals).

Fluoropolymer containing ethylenically unsaturated group (1): fluoropolymer (A-1) disclosed in Production Example 3 in JP-A-2005-89536.

MEK-ST-L: 30% colloidal dispersion of silica (manufactured by NISSAN CHEMICAL INDUSTRIES, Ltd.) in MEK.

DPHA: mixture of dipentaerythritol pentaacrylate with dipentaerythritol hexaacrylate (manufactured by NIPPON KAYAKU Co., Ltd.).

SP-13: fluorine-containing surfactant (mass-average molecular weight 14,000).

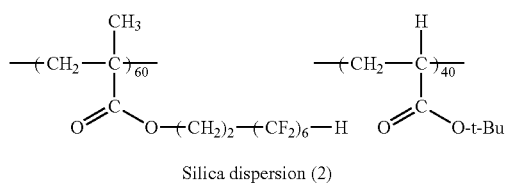

Silica dispersion (2)

To 500 g of hollow silica microparticle sol (an isopropyl alcohol silica sol; prepared according to Preparation Example 4 in JP-A-2002-79616 but changing the condition therein so as to give an average particle diameter of 60 nm, a shell thickness of 10 nm, a silica concentration of 20% by mass and a refractive index of the silica particles of 1.31), 10 g of acryloyloxypropyl trimethoxysilane (manufactured by SHIN-ETSU CHEMICAL Co., Ltd.) and 1.0 g of diisopropoxy aluminum ethyl acetate were added. After mixing, 3 g of ion-exchanged water was added. After reacting the mixture at 60° C. for 8 hours, it was cooled to room temperature and 1.0 g of acetylacetone was added.

500 g of this dispersion was subjected to solvent-replacement by distilling under reduced pressure while adding cyclohexanone so that the silica content remained at almost the same level. As a result, no foreign matter was observed in the dispersion. When the solid concentration was adjusted to 22% by mass with the use of cyclohexanone, the viscosity at 25° C. was 5 mPa·s. The amount of the isopropyl alcohol remaining in the silica dispersion (2) thus obtained was 1.0% in the measurement by gas chromatography.

Example 1

Production of Antiglare Optical Film (1) Formation of Antiglare Layer

A triacetyl cellulose film of 80 μm in thickness (TAC-TD80U, manufactured by FUJI PHOTOFILM) was unwound in a rolled state. Then the coating solution A-1 for antiglare layer as described above was applied by the die coating method using a slot die disclosed in Example 1 in JP-A-2006-122889 at a traveling speed of 30 m/min and then dried at 60° C. for 150 seconds. Next, the layer was cured by irradiating with ultraviolet rays under nitrogen-purge at an oxygen concentration of about 0.1% by using a 160 W/cm air-cool metal halide lamp (manufactured by EYEGRAPHICS) at an illuminance of 400 mW/cm$^2$ and an irradiation dose of 100 mJ/cm$^2$. The antiglare layer thus formed was wound. The coating amount was controlled so as to give a film thickness of the antiglare layer of 14 μm.

(2) Formation of Low Refractive Index Layer

The triacetyl cellulose film having the antiglare layer formed above was unwound again. Then the coating solution (L-1) for low refractive index layer as described above was applied by the die coating method using the above-described slot die at a traveling speed of 30 m/min and then dried at 90° C. for 75 seconds. Next, the layer was cured by irradiating with ultraviolet rays under nitrogen-purge at an oxygen concentration of about 0.01 to 0.1% by using a 240 W/cm air-cool metal halide lamp (manufactured by EYEGRAPHICS) at an illuminance of 400 mW/cm$^2$ and an irradiation dose of 240 mJ/cm$^2$. The low refractive index layer of 100 nm in thickness thus formed was wound. Thus, an antiglare optical film equipped with the low refractive index layer was formed. The refractive index (n) of the low refractive index layer was 1.36.

(Saponification of Optical Film)

After the formation, the antiglare optical film sample was treated in the following manner. A 1.5 mol/L aqueous sodium hydroxide solution was prepared and maintained at 55° C. A 0.01 mol/L dilute aqueous sulfuric acid solution was prepared and maintained at 35° C. The optical film produced above was dipped in the aqueous sodium hydroxide solution for 2 minutes and then dipped in water to thereby thoroughly wash away the aqueous sodium hydroxide solution. Subsequently, it was dipped in the dilute aqueous sulfuric acid solution for 1 minute and then dipped in water to thereby thoroughly wash away the dilute aqueous sulfuric acid solution. Finally, the sample was sufficiently dried at 120° C.

Thus, a saponified antiglare optical film sample No. 132 was obtained.

In this antiglare optical film sample No. 132, the antiglare layer thickness, the amount and kind of the resin particles employed and the presence or absence of the low refractive index layer were altered as listed in Table 1 to give saponified antiglare optical film samples 101 to 131 and 133 to 140.

The particles employed are as follows.
6 μm crosslinked styrene particles (3)
refractive index: 1.60
6 μm crosslinked acryl/styrene particles (4)
refractive index: 1.59
6 μm crosslinked acryl/styrene particles (5)
refractive index: 1.58
6 μm crosslinked acryl/styrene particles (6)
refractive index: 1.57
6 μm crosslinked acryl/styrene particles (7)
refractive index: 1.55
6 μm crosslinked acryl/styrene particles (8)
refractive index: 1.54
6 μm crosslinked acryl/styrene particles (9)
refractive index: 1.53
6 μm crosslinked acryl/styrene particles (10)
refractive index: 1.56
8 μm crosslinked acryl (MMA: methyl methacrylate) (11)
refractive index: 1.49

The refractive indexes of the particles were adjusted to the desired levels by controlling the copolymerization ratio of styrene having a high refractive index to acryl having a low refractive index.

(Production of Polarizing Plate)

A polarizing film was produced by absorbing iodine onto a stretched polyvinyl alcohol film. Then, the polarizing film was bonded on both faces to triacetyl cellulose films of 80 μm in thickness (TAC-TD80U, manufactured by FUJI PHOTOFILM) having been saponified in the same manner as described above or each of the optical film samples as described above (having been saponified) and thus protected, thereby giving a polarizing plate.

(Evaluation of Polarizing Plate)

A part of the polarizing plate in the viewer's side of a liquid crystal TV (KDL-40J5000, manufactured by Sony Co., Ltd.)

was peeled off and each of the polarizing plates as described above was adhered thereto, thereby producing a liquid crystal display device. The antiglare optical film was provided at the viewer-side outermost surface of the liquid crystal TV. The obtained liquid crystal display devices were evaluated in the following items. Table 1 shows the results. (Evaluation of optical films, polarizing plates and liquid crystal display devices)

1) Tilt Angle Distribution Profile

In the measurement of the optical films thus obtained, use was made of Model SXM520-AS150 manufactured by Micromap (USA). As the light source, a halogen lamp having an interference filter with a central wavelength of 560 nm inserted thereinto was employed. An object lens having 10-magnification was employed and data intake was performed with a ⅔ inch CCD having pixels of 640×480. By using this construction, the measurement pitches in the lengthwise and widthwise directions were 1.3 micrometer, the unit for the tilt angle was 0.8 square micrometers and the area to be measured was 500,000 square micrometers (0.5 square millimeters).

The tilt angle was calculated from the height data at three points employed as the measurement unit. Based on the total measurement data, the integrated frequency value of the tilted plane components having tilt angles ranging from 0.05 to 0.25° and the integrated frequency value of the tilted plane components having tilt angles ranging from 1.5 to 2.5° were determined.

2) Average Reflectivity (Integrating Sphere-Measured Reflectivity)

The back face (i.e., the transparent substrate side face) of the antiglare optical film was roughened with a sandpaper and then treated with a black ink. In this back reflection-free state, the spectral reflectivity of the front face of the film was measured within a wavelength range of from 380 to 780 nm by using a spectrophotometer (manufactured by JASCO Corporation). The measurements were then averaged over a wavelength range of from 450 to 650 nm to give an arithmetic average integrating sphere-measured reflectivity.

3) White Blur

White blur was sensorily evaluated using a liquid crystal display device (KDL-40J5000, manufactured by Sony Co., Ltd., indoor environment 500 Lux) provided with a polarizing plate having the antiglare optical film sample bonded to the viewer's side surface. The evaluation was made by simultaneously and relatively compared multiple displays arranged in a line. Placing a light source right in front of the displays, white blur at switch-off and white blur at switch-on (in black image) were compared among the antiglare optical film samples. The criteria for the evaluation are as follows. A white blur-free display screen is preferred.

A: No white blur and very high definitiveness in black color.

B: Little white blur and high definitiveness in black color.

C: Noticeable white blur and less definitiveness in black color.

D: Serious white blur and no definitiveness in black color (NG).

4) Prevention of the Formation of Reflected Image

The liquid crystal display device as described above was placed at the height of 0.8 m from the floor in one wall side of an experimental room (10 m in width, 20 m in length and 3 m in height). A viewer was placed at a distance 2 m from the liquid crystal display device at the height of 0.8 m from the floor (i.e., the same level as the liquid crystal display device). Providing fluorescent lamps on the ceiling at intervals of 2 m, prevention of the formation of reflected images of the fluorescent lamps was observed and evaluated at the position 4 m away from the liquid crystal display device (supposing common home environment) or at the position 10 m away from the liquid crystal display device (supposing station/airport waiting room environment). The illuminance in the room was 500 Lux. FIG. 2 shows the evaluation system.

A: Little reflected images of the fluorescent lamp outline observed in both of the home and station/airport waiting room environments.

B: Slight reflected images of the fluorescent lamp outline observed in both of the home and station/airport waiting room environments.

C: Reflected images of the fluorescent lamp outline observed in either of the home and station/airport waiting room environments.

D: Definite reflected images of the fluorescent lamp outline observed in either or both of the home and station/airport waiting room environments. (NG)

Table 1 summarizes the evaluation results of the individual samples. In the "Remarks" of the Table 1, "A" denotes

TABLE 1

| | Antiglare layer | | | | | | | | |
|---|---|---|---|---|---|---|---|---|---|
| | | Primary particles | | | | Secondary particles | | | |
| Sample no. | Kind | Refractive index | Diameter (μm) | Content (Wt %) | Kind | Refractive index | Diameter (μm) | Content (Wt %) | Layer thickness |
| 101 | (2) | 1.56 | 6 | 8 | (1) | 1.49 | 6 | 2 | 14 |
| 102 | (2) | 1.56 | 6 | 7 | (1) | 1.49 | 6 | 2 | 14 |
| 103 | (2) | 1.56 | 6 | 6 | (1) | 1.49 | 6 | 2 | 14 |
| 104 | (2) | 1.56 | 6 | 5 | (1) | 1.49 | 6 | 2 | 14 |
| 105 | (2) | 1.56 | 6 | 4 | (1) | 1.49 | 6 | 2 | 14 |
| 106 | (2) | 1.56 | 6 | 8 | (1) | 1.49 | 6 | 2 | 13 |
| 107 | (2) | 1.56 | 6 | 8 | (1) | 1.49 | 6 | 2 | 12 |
| 108 | (2) | 1.56 | 6 | 8 | (1) | 1.49 | 6 | 2 | 11 |
| 109 | (2) | 1.56 | 6 | 8 | (1) | 1.49 | 6 | 2 | 10 |
| 110 | (2) | 1.56 | 6 | 8 | (1) | 1.49 | 6 | 2 | 9 |
| 111 | (2) | 1.56 | 6 | 8 | (1) | 1.49 | 6 | 2 | 8 |
| 112 | (2) | 1.56 | 6 | 8 | (1) | 1.49 | 6 | 3 | 14 |
| 113 | (2) | 1.56 | 6 | 8 | (1) | 1.49 | 6 | 4 | 14 |
| 114 | (2) | 1.56 | 6 | 8 | (1) | 1.49 | 6 | 5 | 14 |
| 115 | (2) | 1.56 | 6 | 8 | (1) | 1.49 | 6 | 6 | 14 |
| 116 | (2) | 1.56 | 6 | 8 | (1) | 1.49 | 6 | 2 | 15 |
| 117 | (2) | 1.56 | 6 | 8 | (1) | 1.49 | 6 | 2 | 16 |
| 118 | (2) | 1.56 | 6 | 8 | (1) | 1.49 | 6 | 2 | 17 |

TABLE 1-continued

| | | | | | | | | | |
|---|---|---|---|---|---|---|---|---|---|
| 119 | (2) | 1.56 | 6 | 8 | (1) | 1.49 | 6 | 2 | 18 |
| 120 | (2) | 1.56 | 6 | 8 | (1) | 1.49 | 6 | 2 | 19 |
| 121 | (2) | 1.56 | 6 | 8 | (1) | 1.49 | 6 | 2 | 20 |
| 122 | (9) | 1.53 | 6 | 8 | (1) | 1.49 | 6 | 2 | 14 |
| 123 | (8) | 1.54 | 6 | 8 | (1) | 1.49 | 6 | 2 | 14 |
| 124 | (7) | 1.55 | 6 | 8 | (1) | 1.49 | 6 | 2 | 14 |
| 125 | (6) | 1.57 | 6 | 8 | (1) | 1.49 | 6 | 2 | 14 |
| 126 | (5) | 1.58 | 6 | 8 | (1) | 1.49 | 6 | 2 | 14 |
| 127 | (4) | 1.59 | 6 | 8 | (1) | 1.49 | 6 | 2 | 14 |
| 128 | (3) | 1.60 | 6 | 8 | (1) | 1.49 | 6 | 2 | 14 |
| 129 | (2) | 1.56 | 6 | 8 | — | — | — | — | 14 |
| 130 | (2) | 1.56 | 6 | 8 | (11) | 1.49 | 8 | 2 | 14 |
| 131 | (10) | 1.56 | 8 | 8 | (1) | 1.49 | 6 | 2 | 14 |
| 132 (102 + low nL-1) | (2) | 1.56 | 6 | 7 | (1) | 1.49 | 6 | 2 | 14 |
| 133 (107 + low nL-1) | (2) | 1.56 | 6 | 8 | (1) | 1.49 | 6 | 2 | 12 |
| 134 (131 + low nL-1) | (10) | 1.56 | 8 | 8 | (1) | 1.49 | 6 | 2 | 14 |
| 135 (102 + low nL-2) | (2) | 1.56 | 6 | 7 | (1) | 1.49 | 6 | 2 | 14 |
| 136 (107 + low nL-2) | (2) | 1.56 | 6 | 8 | (1) | 1.49 | 6 | 2 | 12 |
| 137 (131 + low nL-2) | (10) | 1.56 | 8 | 8 | (1) | 1.49 | 6 | 2 | 14 |
| 138 | (2) | 1.56 | 6 | 8 | (10) | 1.56 | 8 | 1 | 14 |
| 139 | (9) | 1.53 | 6 | 8 | — | — | — | — | 14 |
| 140 | (3) | 1.60 | 6 | 8 | — | — | — | — | 14 |

| | | Evaluation results | | | | | |
|---|---|---|---|---|---|---|---|
| Sample no. | Low refractive index layer | Integrating sphere-measured reflectivity (%) | Integrated frequency value (%) (0.05-0.25°) | Integrated frequency value (%) (1.5-2.55°) | Formation of reflected image | White blur | Remarks |
| 101 | No | 4.4 | 20 | 20 | A | B | Invention |
| 102 | No | 4.5 | 23 | 19 | A | B | Invention |
| 103 | No | 4.5 | 25 | 17 | A | B | Invention |
| 104 | No | 4.5 | 30 | 17 | D | B | Comparison |
| 105 | No | 4.5 | 34 | 16 | D | B | Comparison |
| 106 | No | 4.4 | 18 | 20 | A | B | Invention |
| 107 | No | 4.4 | 16 | 21 | A | B | Invention |
| 108 | No | 4.4 | 13 | 22 | B | B | Invention |
| 109 | No | 4.4 | 10 | 22 | B | B | Invention |
| 110 | No | 4.4 | 8 | 23 | D | B | Comparison |
| 111 | No | 4.4 | 5 | 23 | D | B | Comparison |
| 112 | No | 4.5 | 20 | 23 | A | B | Invention |
| 113 | No | 4.5 | 19 | 25 | A | B | Invention |
| 114 | No | 4.5 | 19 | 30 | A | D | Comparison |
| 115 | No | 4.5 | 18 | 36 | A | D | Comparison |
| 116 | No | 4.4 | 20 | 18 | A | B | Invention |
| 117 | No | 4.4 | 20 | 16 | A | B | Invention |
| 118 | No | 4.4 | 22 | 13 | B | B | Invention |
| 119 | No | 4.4 | 22 | 10 | B | B | Invention |
| 120 | No | 4.5 | 23 | 8 | D | B | Comparison |
| 121 | No | 4.5 | 23 | 5 | D | B | Comparison |
| 122 | No | 4.5 | 9 | 18 | C | B | Comparison |
| 123 | No | 4.5 | 9.5 | 19 | C | B | Comparison |
| 124 | No | 4.5 | 16 | 21 | A | B | Invention |
| 125 | No | 4.5 | 20 | 21 | A | B | Invention |
| 126 | No | 4.5 | 22 | 21 | A | B | Invention |
| 127 | No | 4.4 | 24 | 29 | A | D | Comparison |
| 128 | No | 4.4 | 24 | 34 | A | D | Comparison |
| 129 | No | 4.4 | 20 | 14 | B | B | Invention |
| 130 | No | 4.4 | 20 | 22 | A | B | Invention |
| 131 | No | 4.4 | 22 | 20 | A | B | Invention |

TABLE 1-continued

| | | | | | | | |
|---|---|---|---|---|---|---|---|
| 132 (102 + low nL-1) | Ln-1 | 1.7 | 24 | 18 | A | A | Invention |
| 133 (107 + low nL-1) | Ln-1 | 1.7 | 17 | 20 | A | A | Invention |
| 134 (131 + low nL-1) | Ln-1 | 1.7 | 23 | 20 | A | A | Invention |
| 135 (102 + low nL-2) | Ln-2 | 2.8 | 24 | 18 | A | A | Invention |
| 136 (107 + low nL-2) | Ln-2 | 2.8 | 17 | 20 | A | A | Invention |
| 137 (131 + low nL-2) | Ln-2 | 2.8 | 23 | 20 | A | A | Invention |
| 138 | No | 4.4 | 21 | 20 | A | B | Invention |
| 139 | No | 4.4 | 9 | 13 | D | B | Comparison |
| 140 | No | 4.4 | 24 | 29 | A | D | Comparison |

In Table 1, the content (wt %) of the particles in the antiglare layer means the percentage by mass of the particles based on the total solid matters contained in the antiglare layer.

The results shown in Table 1 clearly indicate the following facts. Namely, the liquid crystal display device having the antiglare optical film according to the invention has excellent optical performance (preventing the formation of reflected images and white bur in various environments over a wide range) that is established by satisfying the requirements in the specific concavo-convex shape on the surface as defined in the invention, i.e., the integrated frequency value of the tilted plane components having tilt angles between the normal line of the transparent substrate and the normal line of the concavo-convex shape on the surface of the antiglare optical film ranging from 0.05 to 0.25° is 10% or more but not more than 25% while the integrated frequency value of the tilted plane components having tilt angles ranging from 1.5 to 2.5° is 10% or more but not more than 25%. According to the invention, a highly excellent liquid crystal display device can be provided.

Table 1 also suggests the following facts.

1. For providing the antiglare optical film according to the invention, it is preferable, in the case of using an ionizing radiation-curing binder matrix, that resin particles to be used in the antiglare optical film have a refractive index of 1.55 to 1.58.

2. For providing the antiglare optical film according to the invention, it is preferable to use two or more kinds of particles having different average particle diameters from each other and/or two or more kinds of particles having different refractive indexes from each other as resin particles to be used in the antiglare optical film.

3. For providing the antiglare optical film according to the invention, it is preferable to form at least one low refractive index layer as the outermost layer and the average integrating sphere-measured reflectivity (the average of the values measured at 450 nm to 650 nm) thereof is preferably less than 3.0% and more preferably less than 2.0%.

As the results of detailed examination on the tilt angle distribution of sample No. 132, the frequency of the region wherein the tilt angle is 0.00 or more but less than 0.05° is 1%, the frequency of the region wherein the tilt angle is more than 0.25 but less than 1.5° is 50% and the frequency of the region wherein the tilt angle exceeds 2.5° is 7%. The frequency of the region wherein the tilt angle exceeds 10° is 0.7%.

Although the invention has been described above in relation to preferred embodiments and modifications thereof, it will be understood by those skilled in the art that other variations and modifications can be effected in these preferred embodiments without departing from the scope and spirit of the invention.

What is claimed is:

1. A liquid crystal display device comprising:
    a protective film;
    a polarizing plate;
    a liquid crystal cell for display; and
    a backlight, in this order,
    wherein the protective film is an antiglare optical film comprising a transparent substrate and at least one antiglare layer and having a concavo-convex shape on a surface of the antiglare optical film, and an integrated frequency value of tilted plane components having tilt angles between a normal line of the transparent substrate and a normal line of the concavo-convex shape on a surface of the antiglare optical film ranging from 0.05 to 0.25° is from 10 to 25% while an integrated frequency value of tilted plane components having the tilt angles ranging from 1.5 to 2.5° is from 10 to 25%
    the antiglare layer has a thickness of 10 μm to 20 μm,
    the antiglare layer includes light transmitting particles, and
    the light transmitting particles have an average particle diameter of 6 μm to 10 μm.

2. The liquid crystal display device of claim 1, wherein the antiglare layer comprises at least a resin matrix and light transmitting particles provided in the resin matrix, and a thickness d of the antiglare layer and an average particle diameter D of the light transmitting particles satisfy all of the following formulae (1), (2) and (3):

$$7 \leq d \leq 30 \ (\mu m) \quad \text{Formula (1)}$$

$$0.25 \leq (D/d) \leq 0.75 \quad \text{Formula (2)}$$

$$2.0 \leq (d-D) \leq 15 \ (\mu m). \quad \text{Formula (3)}$$

3. A liquid crystal display device of claim 2, wherein the light transmitting particles contained in the antiglare layer have a refractive index of from 1.55 to 1.58.

4. The liquid crystal display device of claim 3, which comprises, as the light transmitting particles contained in the antiglare layer, at least either of: two or more of particles having different average particle diameters from each other; and two or more of particles having different refractive indexes from each other.

5. The liquid crystal display device of claim 3, wherein the antiglare optical film has, as an outermost layer, a layer having a refractive index that is lower than the refractive index of the adjacent layer, and the integrating sphere-measured reflectivity, which is an average of values measured at 450 nm to 650 nm, of the antiglare optical film is less than 3.0%.

6. The liquid crystal display device of claim 2, which comprises, as the light transmitting particles contained in the antiglare layer, at least either of: two or more of particles having different average particle diameters from each other; and two or more of particles having different refractive indexes from each other.

7. The liquid crystal display device of claim 6, wherein the antiglare optical film has, as an outermost layer, a layer having a refractive index that is lower than the refractive index of the adjacent layer, and the integrating sphere-measured reflectivity, which is an average of values measured at 450 nm to 650 nm, of the antiglare optical film is less than 3.0%.

8. The liquid crystal display device of claim 2, wherein the antiglare optical film has, as an outermost layer, a layer having a refractive index that is lower than the refractive index of the adjacent layer, and the integrating sphere-measured reflectivity, which is an average of values measured at 450 nm to 650 nm, of the antiglare optical film is less than 3.0%.

9. The liquid crystal display device of claim 1, wherein the antiglare optical film has, as an outermost layer, a layer having a refractive index that is lower than the refractive index of the adjacent layer, and the integrating sphere-measured reflectivity, which is an average of values measured at 450 nm to 650 nm, of the antiglare optical film is less than 3.0%.

10. The liquid crystal display device of claim 1, wherein a diagonal length of a display screen of the liquid crystal display device is 32 inches or more.

* * * * *